United States Patent [19]

Porter

[11] Patent Number: 5,179,307
[45] Date of Patent: Jan. 12, 1993

[54] DIRECT CURRENT BRUSHLESS MOTOR

[75] Inventor: Richard L. Porter, Navarre, Fla.

[73] Assignee: The United States of America as represented by the Secretary of the Air Force, Washington, D.C.

[21] Appl. No.: 840,205

[22] Filed: Feb. 24, 1992

[51] Int. Cl.⁵ .................. H02K 11/00; H02K 21/12; H02K 1/22; H02P 7/06
[52] U.S. Cl. .................. 310/68 B; 310/156; 310/268; 318/254; 318/480
[58] Field of Search .......... 310/68 B, 68 R, 156, 310/268; 318/138, 254, 480, 696, 701; 250/231.13, 231.14, 231.18, 229

[56] References Cited

U.S. PATENT DOCUMENTS

| | | | |
|---|---|---|---|
| 3,569,806 | 3/1971 | Brailsford | 318/254 |
| 3,579,277 | 5/1971 | Imahashi | 310/156 |
| 3,663,877 | 5/1972 | Clark | 318/254 |
| 3,701,042 | 10/1972 | Dukes | 318/138 |
| 3,832,613 | 8/1974 | Bernstein et al. | 318/269 |
| 4,027,213 | 5/1975 | de Valroger | 318/138 |
| 4,220,879 | 9/1980 | Hoshimi et al. | 310/68 R |
| 4,267,914 | 5/1981 | Saar | 318/461 |
| 4,405,885 | 9/1983 | Okamoto | 318/254 |
| 4,409,524 | 10/1983 | Nielsen et al. | 318/138 |
| 4,475,068 | 10/1984 | Brailsford | 318/254 |
| 4,684,857 | 8/1987 | Llopis | 250/231.13 |
| 4,748,387 | 5/1988 | Tanuma et al. | 318/254 |
| 4,857,783 | 8/1989 | Prunkard | 310/68 B |
| 4,967,122 | 10/1990 | Rees | 318/254 |
| 4,973,869 | 11/1990 | Cho | 310/68 B |
| 5,023,527 | 6/1991 | Erdman et al. | 318/254 |

FOREIGN PATENT DOCUMENTS

| | | | |
|---|---|---|---|
| 0208123 | 1/1987 | European Pat. Off. | 310/68 R |
| 2-73053 | 11/1990 | Japan | 310/68 B |

Primary Examiner—Steven L. Stephan
Assistant Examiner—C. La Balle
Attorney, Agent, or Firm—Berard E. Franz; Donald J. Singer

[57] ABSTRACT

The variable speed, reversible, brushless, direct current motor comprises a rotor, electromagnets a switching transistor module and electronic controller module. The rotor is mounted on a shaft with bearings at each end, with a plurality of permanent magnets symmetrically placed thereon in an alternating field pattern. Each electromagnet invokes a magnetic field at two permanent magnet positions to cause rotation of the rotor. The switching transistor module receives power from two power sources to conduct current and energize the electromagnets. The electronic control module supplies alternating voltage to points on the transistor module. The switching waveform is triggered by infrared pick-ups mounted next to the rotor. In operation, each time an electromagnet is switched in polarity, the rotor rotates thirty-six degrees until the permanent magnets are aligned with the electromagnet. Each time the polarity is switched, the permanent magnet that is aligned is repelled, while the permanent magnet approaching is attracted. The infra-red pick-ups switch at such a time to continue the rotation.

5 Claims, 3 Drawing Sheets

DIRECT CURRENT BRUSHLESS MOTOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a direct current brushless motor.

DC motors have long been used in the power field and in the commercial marketplace. Traditionally, these motors make use of field windings and an armature which is energized by brushes through a commutator. In general, these motors work very well and are very efficient. Some motors make use of permanent magnets for the field, but this is limited. Typically, maintenance on these motors is not too much of a concern until they are operated in a harsh environment, which causes wear on the brushes. Most motors are carefully designed for specific applications based on the horsepower and speed required.

The following United States patents are of interest.
4,973,869—Cho
4,857,783—Prunkard
4,220,879—Hoshimi et al
3,579,277—Imahashi The patents identified above relate to various designs for brushless, direct current (DC) motors. In particular, the Cho patent describes a disc type brushless, cordless, DC motor. The motor comprises a rotor, stator, armature coil, and a position detector sensor. The position detector sensor is installed below an effective coil part of the armature coil. A single screw, having a rounded head, is installed at the position one-fifth of a magnetic pole width apart from the position detector sensor. This type of placement provides for larger starting torque with lower starting voltage. The Prunkard patent is directed to a brushless DC motor which comprises a rotor, a magnetic leaf switch, and a ferrous core coil winding. The rotor incorporates a flat, annular two pole permanent magnet and a rotational output shaft passing through the magnet. The magnetic leaf switch floats in the magnetic field of the permanent magnet. The ferrous core coil winding serves as a stator which is energized by direct current. Current flow to the stator is controlled in an alternating on-off manner by the magnetic leaf switch. When the stator is energized, the core assumes a polarity that repels one of the poles of the permanent magnet carried by the rotor. This repulsion causes rotation of the permanent magnet about the longitudinal axis of the rotational output shaft. The Hoshimi et al patent relates to a brushless DC motor comprising a rotor, stator and detecting elements. The rotor includes a rotor magnet, with a number of poles, mounted on a rotor yoke which in turn is mounted on a rotor shaft. The stator includes a stator yoke and a number of stator coils disposed on the stator yoke to face the rotor magnet in a non-overlapping predetermined angular relation to each other. Wiring means are disposed on the stator yoke and are connected to the stator coils. The detecting elements are mounted on the wiring means to sense the rotational position of the rotor magnet and provide a signal by which current fed to the stator coils can be controlled. The Imahashi et al patent relates to a brushless DC motor. Pairs of axially spaced permanent magnets are radially arranged about and fixed to a rotor shaft, and driving coils are disposed in the space between the pairs of permanent magnets. A shield ring having cutaway Portions is disposed in the path of detecting coils so that when the cutaway portions are aligned with positional detecting coils, the driving coils associated with the particular detecting coils, are activated to produce a driving force.

SUMMARY OF THE INVENTION

An objective of the invention is to provide direct current motor which has both a low maintenance operation and is safe in a hazardous environment. A further objective is to eliminate the production of ozone (a known air pollutant) by the arcing inherent in modern DC motors using brushes to energize the rotor.

The invention relates to a variable speed, reversible, brushless, direct current motor. The motor comprises a rotor, electromagnets, a switching transistor module and electronic controller module. The rotor is mounted on a shaft with ball bearings at each end, with a plurality of permanent magnets symmetrically placed thereon in an alternating field pattern. Each electromagnet invokes a magnetic field at two permanent magnet positions to cause rotation of the rotor. The switching transistor module receives power from two power sources to conduct current and energize the electromagnets. The electronic control module supplies alternating voltage to points on the transistor module. The switching waveform is triggered by infra-red pick-ups mounted next to the rotor. In operation, each time an electromagnet is switched in polarity, the rotor rotates thirty-six degrees until the permanent magnets are aligned with the electromagnet. Each time the polarity is switched, the permanent magnet that is aligned is repelled, while the permanent magnet approaching is attracted. The infra-red pick-ups switch at such a time to continue the rotation.

DETAILED DESCRIPTION

The motor makes use of permanent magnets to set up a static flux field on the rotor and electromagnets surrounding the rotor. This type of motor has no brushes since the rotor is not energized externally and the speed, torque, and direction of rotation are easily controllable. A prototype concept design has been built to verify the performance. There are basically four parts to this prototype motor design, shown in FIGS. 1, 2, 5 and 6. These parts are the rotor 10, electromagnet 40, a switching transistor module shown in FIG. 5, and an electronic controller module shown in FIG. 6.

Figure 1:
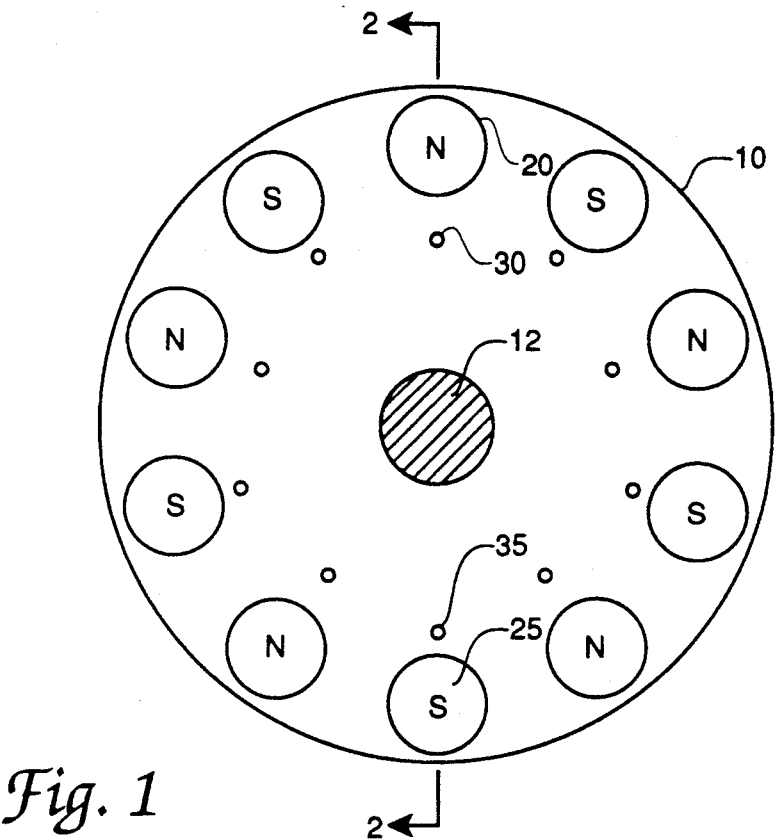
FIG. 1 is a view of a rotor taken along lines 1—1 of FIG. 2.
Figure 2:
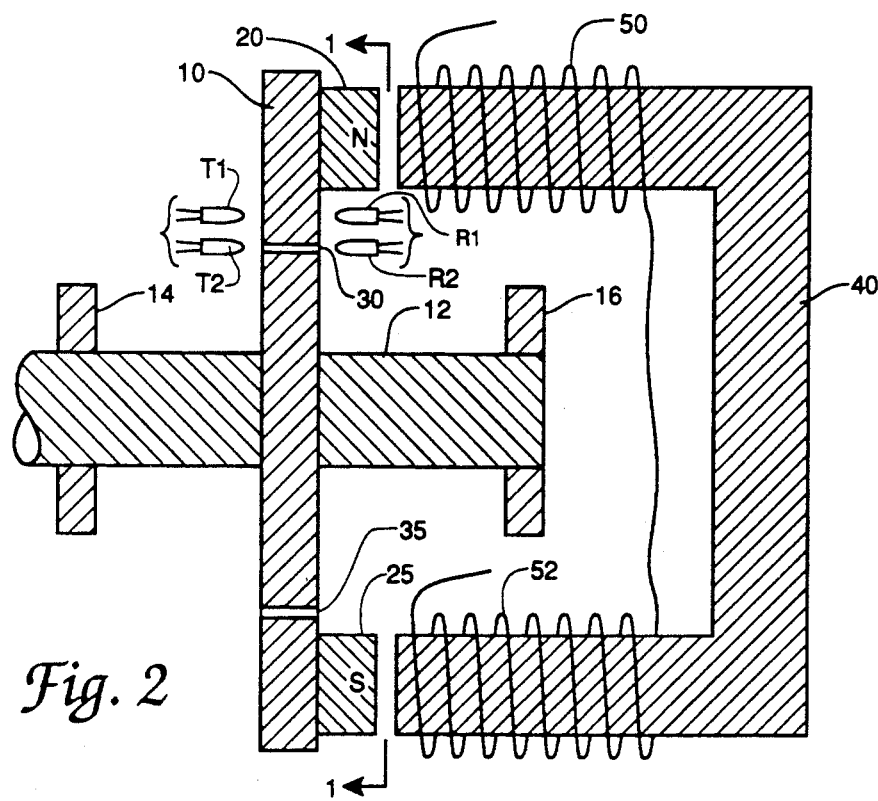
FIG. 2 is a cross section view of the rotor taken along lines 2—2 of FIG. 1, along with an electromagnetic stator for a brushless motor.

FIG. 1 is a view of the rotor 10 taken along lines 1—1 of FIG. 2; and FIG. 2 is a cross section view of the rotor taken along lines 2—2 of FIG. 1, along with the electromagnetic stator 40. The rotor 10 is a round disk with a diameter of about 9 inches, and about ½ inch thick. Ten permanent magnets were glued to the rotor symmetrically at 36 degrees apart, with five north poles up and five south poles up mounted alternately as shown in FIG. 1. The rotor is mounted on a shaft 12 with ball bearings in supports 14 and 16 at each end. A small section on one end of the shaft extends slightly through the bearing support 14 so that a pulley can be mounted. The rotor 10 was made of aluminum, but any material can be used as long as it is non-magnetic. The weight of the rotor acts like a fly wheel and smooths the action of rotational forces produced.

The inexpensive magnets used in the prototype were very weak. In a future model of a final design, magnets made of neodymium or samarium would be used. These are much more powerful and are capable of retaining the magnetism in the presence of external magnetic fields. The magnets would preferably be mounted inside the rotor through drilled holes.

A single U-shaped electromagnet 40, shown in FIG. 2, was used. The shape of this electromagnet was such that it would invoke a magnetic field at two permanent magnet positions. In the position of the rotor 10 as shown, one end is adjacent the north pole of magnet 20, and the other end is adjacent the south pole of magnet 25. The material used for the electromagnet is soft rolled iron which has good permeability. A few hundred feet of #24 gauge magnet wire is wrapped in the same direction with half at each end, to form coils 50 and 52. This will help in providing maximum flux at the ends. Larger wire sizes can be used if the current supply is adequate. With the #24 gauge wire, about 6 amperes will flow with 12 volts DC applied.

Figure 3:
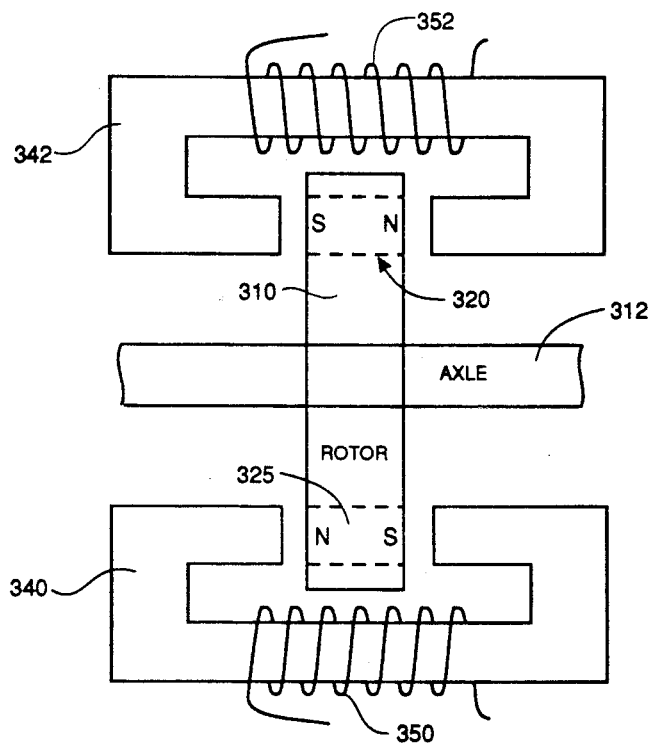
FIGS. 3 and 4 are symbolic drawings respectively of a single rotor design and a multi-rotor design for brushless motors.
Figure 4:
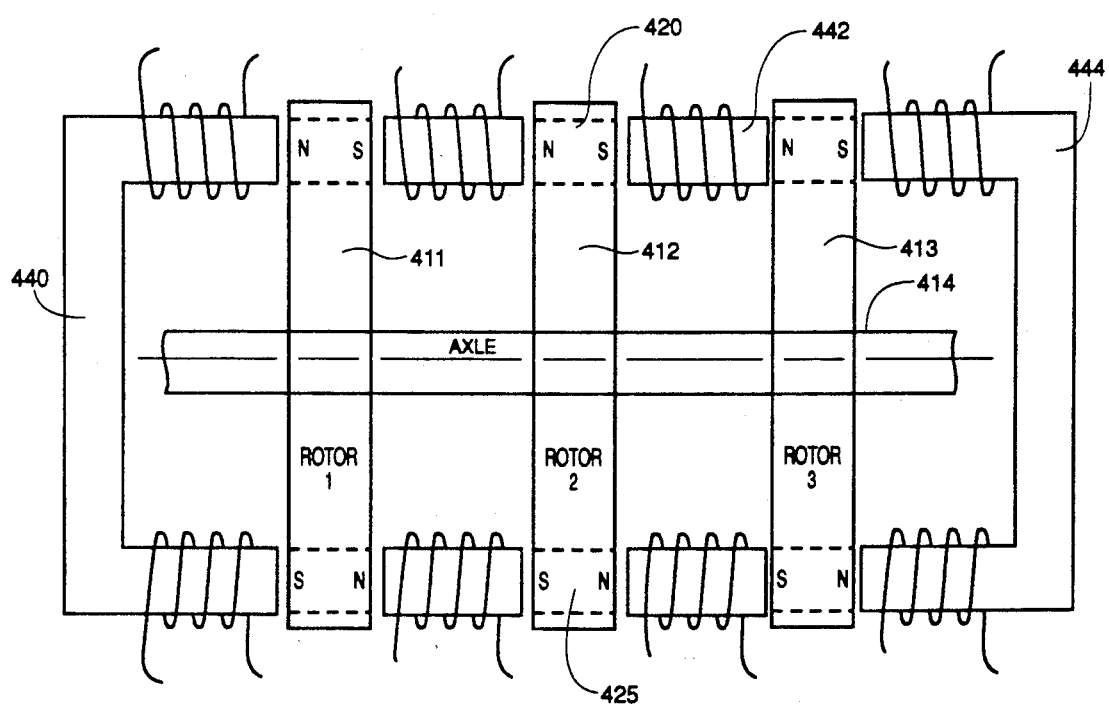

FIGS. 3 and 4 show some possible alternative designs. FIG. 3 shows a single rotor 310 on an axle 312. For this design, electromagnets in the shape of toroids with a section of each removed may be used such that they are outside the rotor, making up both sides of each permanent magnet. The permanent magnets are mounted in holes in the rotor, alternating in polarity. With ten permanent magnets, ten electromagnets would be used. The figure shows one permanent magnet 320 having the north pole facing to the right, with a electromagnet toroid 342 having a coil 352; and one permanent magnet 325 having the south pole facing to the right, with a electromagnet toroid 340 having a coil 350.

Another version shown in FIG. 4 might entail several rotors with straight electromagnets such as 442 between them. The figure shows three rotors 411, 412 and 413 on an axle 414. U-shaped electromagnets 440 and 444 are used at the ends. The permanent magnets such as magnets 420 and 425 are mounted in holes in the rotors as in FIG. 3. There are many designs possible, each with its own merits.

A solid iron core would get very warm due to hysteresis and eddy currents. To reduce the eddy currents, laminated slices should be used as in a transformer. Other materials can be used to reduce the core losses from hysteresis. The electromagnet is energized by a switching transistor module. Switching of the poles is the primary driving force to cause rotation.

Figure 5:
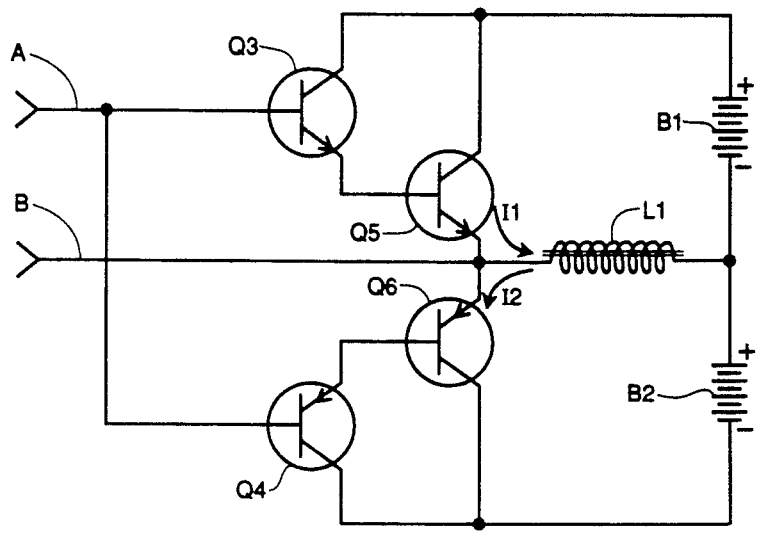
FIG. 5 is a schematic drawing of a switching transistor module for driving the motor.

As shown in FIG. 5, the switching transistor module uses two NPN transistors Q3 and Q5 (type ECG373 and 2N3055 respectively) in a Darlington configuration having the emitter of transistor Q3 connected to the base of transistor Q5, and two PNP transistors Q4 and Q6 (type ECG374 and MJ2955 respectively) in another Darlington configuration having the emitter of transistor Q4 connected to the base of transistor Q6. A line A is connected to the bases of transistors Q3 and Q4, and a line B is connected to the emitters of transistors Q5 and Q6. As lines A and B are reversed in polarity, transistors Q3 and Q4 conduct alternatively. When line A is positive with respect to line B, transistors Q3 and Q5 will conduct and energize the inductor L1, with current I1 as shown. When line B is positive with respect to line A, transistors Q4 and Q6 will conduct and energize the electromagnet L1, with current I2 as shown. Thus as lines A and B change polarity, the electromagnet L1 will reverse its poles. The electromagnet L1 comprises the core 40 of FIG. 2, with windings 50 and 52.

The switching design requires two power sources, shown as batteries B1 and B2, each providing 12 volts. Battery B1 has its positive pole connected to the collectors of transistors Q3 and Q5, while battery B2 has its negative pole connected to the collectors of transistors Q4 and Q6. The electromagnet L1 has one end of its coil connected to line B, and the other end connected to the negative pole of battery B1 and the positive pole of battery B2. The configuration of FIG. 5 results in the transistors and power sources supplying current only half the time. Also, the dual power source allows push-pull current switching in winding L1 providing low switching transients for the switching transistors. The power transistors Q5 and Q6 used are only good for 15 amperes maximum. They would require parallel combinations for higher current switching.

Figure 6:
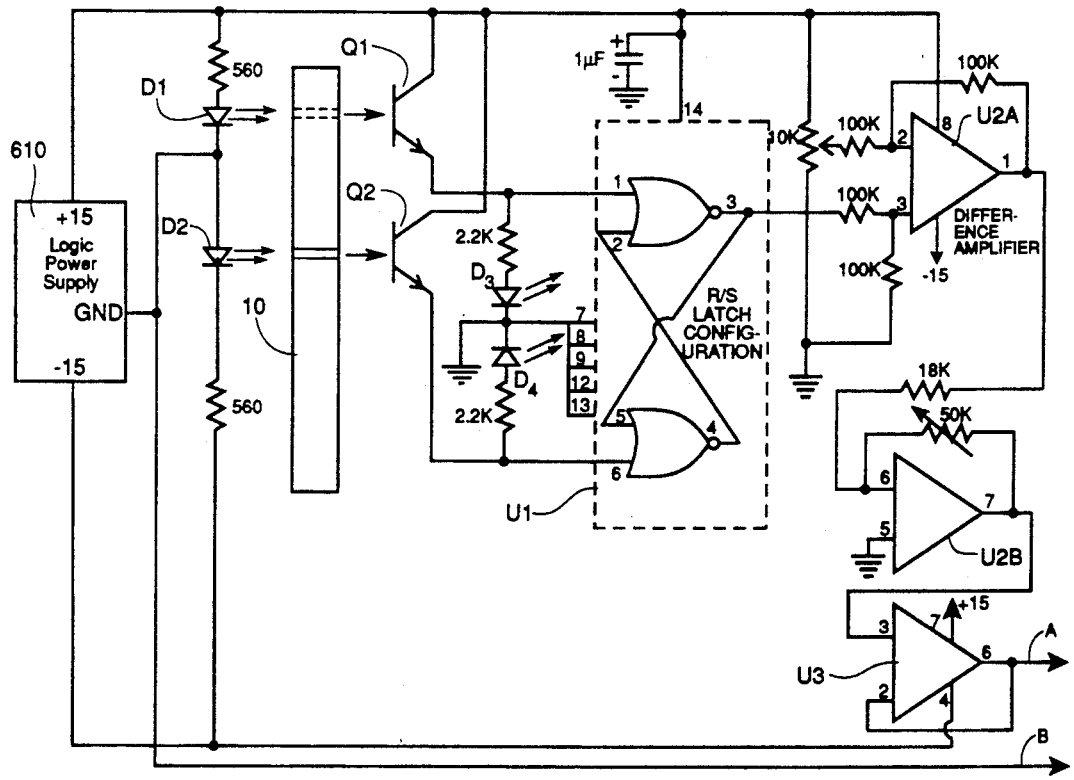
FIG. 6 is a block and schematic drawing of an electronic control module.

The electronic control module shown in FIG. 6 supplies the alternating voltage source to lines A and B of the transistor module. The switching waveform is triggered by infrared (IR) pick-ups mounted next to the rotor 10. The transmit/receive pairs are shown in FIG. 2 as transmitters T1 and T2 paired respectively with receivers R1 and R2. In FIG. 6, light emitting diodes D1 and D2 (type SEP8703-1) are used for the infrared transmitters, and phototransistors Q1 and Q2 (type TIL414) are used as the infrared receivers. Small ⅛" holes are drilled in the rotor 10 as shown in FIGS. 1 and 2. They provide a path for the infrared light to pass through when the rotor is in a specific position. In this design, the holes line up with the transmit/receive pairs when the permanent magnets are lined up with the electromagnets. There are two rows of holes located on different diameters. The holes 30, 32, 34, 36 and 38 lined up with the north poles are on a smaller diameter than the holes 31, 33 35, 37 and 39 lined up with the south poles. The diameters of the two row differ by ½ inch. By making use of two rows of holes for this purpose, as the rotor turns, the holes on the larger diameter energize one pair and the holes on the smaller diameter energize the other pair alternately for each 36° of rotation. The hole 30 is shown lined up with the transmit/receive pair T2/R2 in FIG. 2 (the path between the light emitting diode D2 and the photoconductive transistor Q2 in FIG. 6).

The signals from these detector pairs provide inputs to a RS (reset-set) latch circuit U1, which comprises two NOR gates on a type 4001 IC chip, with the reset input being pin 1 of one NOR gate and the set input being pin 6 of the other NOR gate. The latch configuration is formed by connecting the output of each NOR gate to an input of the other. Output pin 3 of the first NOR gate is the output of the latch. The phototransistors Q1 and Q2 have their collector terminals connected to +15 volts, and their emitter terminals connected respectively to the reset and set inputs of the latch U1. There is also a light emitting diode D3 in series with a 2200-ohm resistor connected from the emitter of phototransistor Q1 to ground, and a light emitting diode D4 in series with a 2200-ohm resistor connected from the emitter of phototransistor Q2 to ground. When a hole such as hole 30 is lined up with the diode D2 the phototransistor Q2 will receive the IR beam and become conducting, causing diode D4 to be lighted, and the latch U1 to be set with its output high at +15 volts. The latch remains set until a hole lines up with Diode D1 to cause the phototransistor Q1 to became conducting and the diode D3 to be lighted, and the latch is then reset with its output at ground potential. Thus, as each detector pair is energized, the output of the latch U1 is reversed.

The circuit of FIG. 6 includes a type LF 353N dual BIFET comprising operational amplifiers U2A and U2B, and a type 741 operational amplifier U3. The op amp U2A is used as a difference amplifier having its input connected to the output of the latch U1 to obtain a voltage swing from 31 7.5 VDC to +7.5 VDC. The output of the amplifier U2A is coupled via a 18K resistor to the input of the op-amp U2B used as a variable gain amplifier to provide a controllable drive signal to lines A and B of the transistor module of FIG. 5. An extra op-amp follower U3 was added between the output of op-amp U2B and the lines A and B for cases involving more drive power requirements. A type 741 op-amp was used for that purpose even though it is not a high power chip (a higher power op-amp may be used for greater drive power requirements). The power source 610 at ±15 VDC is used to drive the electronic unit of FIG. 6. This provides enough voltage to saturate the power transistors in the transistor module.

The simple circuit of FIG. 6 is used to provide a waveform to verify the design concept. Probably another circuit would be used to provide the drive signal, but the IR pick-ups or other position detector would be required to know when to switch the electromagnet polarity.

Why does it work? Well, each time the electromagnet is switched in polarity, the rotor will rotate 36 degrees until the permanent magnets are aligned with the electromagnet. This is unique in that each time the polarity is switched, the permanent magnet that is aligned is repelled while the one approaching is attracted. This is a kind of push-pull design. The IR pick-ups switch at such a time as to continue the rotation.

One can determine the speed of the rotor by measuring the switching frequency of the electromagnet. Simply divide this frequency by five to obtain the revolutions per second of the rotor, or another way of saying it, the rotor will rotate one revolution with the electromagnet changing poles ten times.

With the embodiment of FIGS. 1, 2, 5 and 6, a speed of 1000 revolutions per minute (RPM) was obtained. With other embodiments, a speed could be reached dependent on how fast one could switch the electromagnet polarity. As an example, if the switching rate could be as high as 1000 Hz, the speed would reach 24,000 RPM. This indicates that speed is not a limit.

The motor will also run in either direction. This is only dependent on the direction it is rotating when energized. An offset in the system allows it to automatically start rotating when power is applied.

The advantages of this type of motor are:

No brushes to wear out.
Permanent magnet design.
Forward or reverse operation.
Can operate in harsh environments.
Variable torque and speed.
No electromagnetic interference from arcing.
Quiet operation.

This type of motor would be excellent for powering cars as its operation is not unlike that of an automobile engine. Since there are no brushes or mechanical contacts in the operation of this motor, it would be safe to operate in hazardous vapor areas (intrinsically safe). Batteries do produce explosive hydrogen and oxygen gases.

Scope of the invention

A broad range of designs can be used to supply the many requirements of a DC motor: wire sizes, electromagnet types and shapes, transistor types and current ratings, rotor sizes and many more.

Since this motor has a very high speed capability, it must be built with a high degree of precision. With speeds in the 10 to 100 thousand RPM range, the materials must be able to withstand the tendency to fly apart.

Most motors today are limited in speed and require a gearbox to obtain these speeds to drive such things as turbines.

The switching technique used in the transistor module is only one of many switching techniques available today. Such techniques are found in switching power supplies.

It is possible that future permanent magnets will be specifically designed for this application. Extremely powerful permanent magnets are being developed today which are making use of superconductor materials. This would greatly enhance the power this type of motor could develop.

ADVANTAGES OF THE INVENTION

1. This motor was specifically designed such that it would not require brushes or any mechanical contacts. This results in longer life and requires less maintenance.

2. As a result of not using brushes, no arcing is present as would be found in that type of commutation. Therefore, no ozone gas is produced. It also produces no electromagnetic interference.

3. This design allows easy control of the torque and speed of operation. The operation is similar to that of an automobile engine; except, in this case, no timing is required. This is due to the speed as which electrical circuits can be switched.

4. This design allows for the motor to operate in either direction. The reversal capability does not require any contacts as mentioned above.

5. Last, but not least, this type of design can operate in very harsh environmental conditions.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A brushless DC motor comprising a rotor which comprises a disk of non-magnetic material and a plurality of permanent magnets which alternate in polarity located around a periphery of the disk, said disk having a first set of holes located at a first radial distance along radii with the permanent magnets of a first polarity, and a second set of holes located at a second radial distance along radii with the permanent magnets of a second polarity;

a stator comprising electromagnetic means having core means and winding means around the core means, with the core means having poles facing said periphery of the rotor, the winding means being connected between first and second terminals;

a first IR transmitter and a first IR receiver located on opposite sides of the rotor at said first radial distance, and a second IR transmitter and a second IR receiver located on opposite sides of the rotor at said second radial distance;

control means including a bistable device having a first input coupled to the first IR receiver and a second input coupled to the second IR receiver, so that each time a hole of said first set passes between the first IR transmitter and the first IR receiver a signal from the first IR receiver sets the bistable device to a first state, and each time a hole of said second set passes between the second IR transmitter and the second IR receiver a signal from the second IR receiver sets the bistable device to a second state, and output means coupled to the bistable device;

switching means comprising a first switch device coupled between a first DC power source of a first polarity and said first terminal, and a second switch device coupled between a second DC power source of a second polarity and said first terminal, the second terminal being connected to a common point of the first and second power sources, the first switch device and the second switch device each having an input coupled to said output means of the control means, so that in response to said bistable device being in said first state the first switch device is turned on to cause current from the first DC power source to flow in a first direction through said winding means, and in response to said bistable device being in said second state the second switch device is turned on to cause current from the second DC power source to flow in a second direction through said winding means, whereby the electromagnetic means alternates in polarity to alternately attract and repel said permanent magnets to cause the rotor to rotate.

2. A brushless DC motor comprising a rotor which comprises a disk of non-magnetic material and a plurality of permanent magnets located around a periphery of the disk, the disk being mounted on a shaft, the permanent magnets being oriented with a direction of magnetization generally parallel to an axis of the shaft, the permanent magnets alternating between a first set having a north pole facing a given direction and an equal number of a second set having a south pole facing said given direction;

a stator comprising electromagnetic means having core means and winding means around the core means, with the core means having poles facing said periphery of the rotor, the winding means being connected between first and second terminals;

position detector means providing a first indication in response to a permanent magnet of the first set being in a given position of rotation facing a given pole of said core means and providing a second indication in response to a permanent magnet of the second set being in said given position of rotation;

control means including a latch having first and second inputs coupled to the position detector means, so that in response to the first indication the latch is set to a first state, and in response to the second indication the latch is set to a second state, output means including a difference amplifier having an input coupled to an output of the latch to provide a signal at a control output line, said signal having a voltage alternating between a first and second polarity in response to the latch being in said first and second states respectively;

switching means comprising a first switch device coupled between a first DC power source of a first polarity and said first terminal, and a second switch device coupled between a second DC power source of a second polarity and said first terminal, the second terminal being connected to a common point of the first and second power sources, the first switch device and the second switch device each having an input coupled to said control output line, so that in response to said signal being at said first polarity the first switch device is turned on to cause current from the first DC power source to flow in a first direction through said winding means, and in response to said signal being at said second polarity the second switch device is turned on to cause current from the second DC power source to flow in a second direction through said winding means, whereby the electromagnetic means alternates in polarity to alternately attract and repel said permanent magnets to cause the rotor to rotate.

3. A brushless DC motor according to claim 2, wherein said first switch device comprises transistor means of a first conductivity type and said second switch device comprises transistor means of a second conductivity type.

4. A brushless DC motor according to claim 3, wherein said disk has a first set of holes located at a first radial distance along radii with the permanent magnets of said first set, and a second set of holes located at a second radial distance along radii with the permanent magnets of said second set;

wherein said position detector means comprises a first IR transmitter and a first IR receiver located on opposite sides of the rotor at said first radial distance, and a second IR transmitter and a second IR receiver located on opposite sides of the rotor at said second radial distance, so that each time a hole of said first set passes between the first IR transmitter and the first IR receiver the first IR receiver provides said first indication, and each time a hole of said second set passes between the second IR transmitter and the second IR receiver the second IR receiver provides said second indication.

5. A brushless DC motor according to claim 3, wherein said first and second IR transmitters are light emitting diodes, and said first and second IR receivers are phototransistors.

* * * * *